(12) United States Patent
Painchaud

(10) Patent No.: US 6,865,319 B2
(45) Date of Patent: Mar. 8, 2005

(54) OPTICAL STRUCTURE FOR THE COMPENSATION OF CHROMATIC DISPERSION IN A LIGHT SIGNAL

(75) Inventor: Yves Painchaud, Silley (CA)

(73) Assignee: Teraxion Inc., Quebec (CA)

(*) Notice: Subject to any disclaimer, the term of this patent is extended or adjusted under 35 U.S.C. 154(b) by 242 days.

(21) Appl. No.: 10/101,229

(22) Filed: Mar. 18, 2002

(65) Prior Publication Data

US 2003/0021532 A1 Jan. 30, 2003

Related U.S. Application Data

(60) Provisional application No. 60/307,365, filed on Jul. 25, 2001.

(51) Int. Cl.$^7$ ................................................ G02B 6/34
(52) U.S. Cl. ........................ 385/37; 385/24; 359/572; 398/81
(58) Field of Search .......................... 385/37, 32, 24; 359/563, 566, 572; 398/81

(56) References Cited

U.S. PATENT DOCUMENTS

| | | | | |
|---|---|---|---|---|
| 5,384,884 A | | 1/1995 | Kashyap et al. ............ 385/129 |
| 5,627,927 A | * | 5/1997 | Udd .............................. 385/37 |
| 5,903,689 A | | 5/1999 | Painchaud et al. ............ 385/37 |
| 5,982,963 A | | 11/1999 | Feng et al. .................... 385/37 |
| 5,987,200 A | | 11/1999 | Fleming et al. | |
| 6,072,926 A | | 6/2000 | Cole et al. .................... 385/37 |
| 6,317,539 B1 | * | 11/2001 | Loh et al. ..................... 385/37 |
| 6,453,095 B2 | * | 9/2002 | Feng et al. .................... 385/37 |
| 6,563,985 B2 | * | 5/2003 | Yin et al. ...................... 385/37 |
| 6,628,861 B1 | * | 9/2003 | Yao .............................. 385/37 |
| 6,643,429 B2 | * | 11/2003 | Robinson et al. ............. 385/37 |
| 6,671,437 B2 | * | 12/2003 | Margalit ........................ 385/37 |
| 6,711,327 B2 | * | 3/2004 | Erdogan et al. .............. 385/37 |
| 6,728,443 B2 | * | 4/2004 | Chowdhury et al. .......... 385/37 |
| 6,760,519 B2 | * | 7/2004 | Oliveti ........................ 385/37 |
| 6,768,822 B1 | * | 7/2004 | Robinson et al. ............. 385/10 |
| 6,807,340 B2 | * | 10/2004 | Postolek et al. .............. 385/37 |
| 2003/0161580 A1 | * | 8/2003 | Morin et al. .................. 385/37 |
| 2003/0194179 A1 | * | 10/2003 | Rumpf et al. ................. 385/37 |
| 2004/0114863 A1 | * | 6/2004 | Eggleton et al. .............. 385/37 |

OTHER PUBLICATIONS

F. Ottellette, "Dispersion cancellation using nearly chirped Bragg grating filters in optical waveguides", Opt. Lett. 12, pp. 847–849 (1987), Oct. 1987.

"Realization of > 10–m–long chirped fiber Bragg gratings" J. F. Brennan and D.L. LaBrake, in BGPP 1999, pp. 35–37, no month.

M. Durkin, M. Ibsen, M.J. Cole, and R.J. Laming, "1 m long continuously–written fibre Bragg gratings for combined second–and third–order dispersion compensation", Electron. Lett. 33, pp. 1891–1893 (1997), Oct. 1997.

A.E. Williner, K.–M_Feng, J.Cal, S. Lee, J. Peng, and H. Sun, "Tunable Compensation of channel degrading effects using nonlinearly chirped passive fiber Bragg gratings", IEEE J. of Selected Topics in Quantum Electron., 5, pp. 1298–1311 (1999), Sep. /Oct. 1999.

(List continued on next page.)

Primary Examiner—Jared J. Fureman
(74) Attorney, Agent, or Firm—Darby & Darby

(57) ABSTRACT

An optical structure and devices based thereon for the compensation of chromatic dispersion in a multi-channel light signal are provided. The optical structure includes a waveguide and a Bragg grating provided therein. The Bragg grating has a plurality of grating components, each associated with one or a few of the channels to be compensated. The period of each grating component is selected to allow compensation of chromatic dispersion experienced by this particular channel or these particluar channels, thereby taking into account the wavelength-dependent dispersion slope of the light signal.

17 Claims, 12 Drawing Sheets

OTHER PUBLICATIONS

A.V. Buryak, and D.Y. Stepanov, "Novel multi-channel grating designs", Proceedings of BGPP 2001, no month.

M. Ibsen, M.K. Durkin, and R.J. Laming "Chirped moiréfiber gratings operating on two-wavelength channels for use as dual-channel dispersion compensators," IEEE Photon, Technol. Lett., 10 pp. 84–86 (1998), Jan. 1998.

M. Ibsen, M.K. Durkin, M.J. Cole, and R.J. Laming, "Sinc-sampled fiber bragg gratings for idential multiple wavelength operation", IEEE Photon Technol. Lett. 10, pp. 842–844 (1998), no month.

J.A.R. Williams, L.A. Everall, I. Bennion, "Fiber Bragg grating fabrication for dispersion slope compensation", IEEE Photon. Technol. Lett. 8 pp. 1187–1189 (1996), Sep. 1996.

Y. Xie, S. Lee, Z. Pan, J.-X. Cal, A.E. Willner, V. Grubsky, D.S. Starodubov, E. Salik, and J. Feinberg, "Tunable Compensation of the Dispersion Slope Mismatch in dispersion-managed systems using a sampled nonlinearly chirped FBG", IEEE Photon. Technol. Lett. 12, pp. 1417–1419 (2000), Oct. 2000.

Y. Painchaud A. Chandonnet, and J. Lauzon, "Chirped fibre gratings produced by tilting the fibre", Electron. Lett. 31, pp. 171–172 (1995), Feb. 1995.

M.J. Cole, W.H. Loh R.I. Laming, M.N. Zarvas, and S. Barcelos, "Moving fibre//phase mask–scanning beam technique for enhanced flexibility in producing fibre gratings with uniform phase mask", Electron. Lett. 31, pp. 1488–1490 (1995), Aug. 1995.

J.A.R. Williams, L.A. Everall, I. Bennion, "Fiber Bragg grating fabrication for dispersion slope compensation", IEEE Photon. Technol. Lett. 8, pp. 1187–1189 (1996), Sep. 1996.

J.A.J. Fells, S.E. Kanellopoulos, P.J. Bennett, V. Baker, H.F.M. Priddle, W.S. Lee, A.J. Collar, C.B. Rogers, D.P. Goodchild, R. Fecad. B.J. Pugh, S.J. Clements, and A. Hadjifotiou, "Twin fibre grating adjustable dispersion compensator for 40 Gbit/s", Proc. ECOC 2000, no month.

Q. Zhou and J.J. Pan, "Sampled Fiber Grating Based–Dispersion Slope Compensator", IEEE Photon, Technology letters vol. 11, No. 10, (Oct. 1999).

International Search Report, Sep. 2003.

* cited by examiner

Group delay of a broadband dispersion compensator based on sampled chirped FBG in which all the channels are identical.

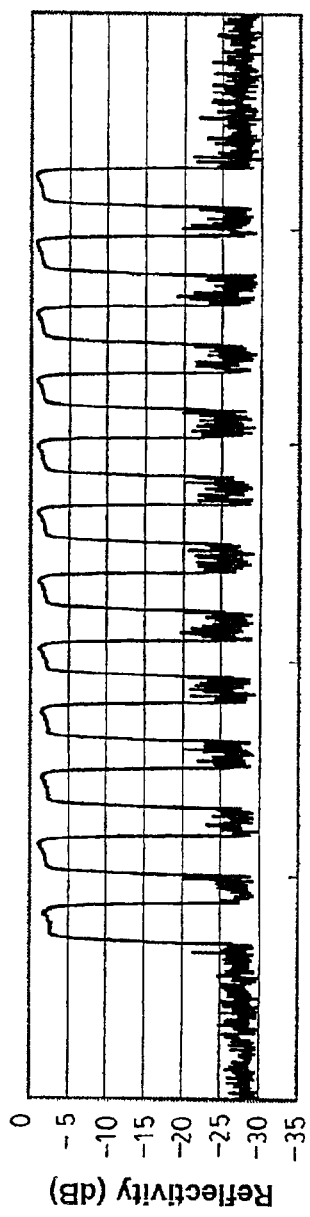
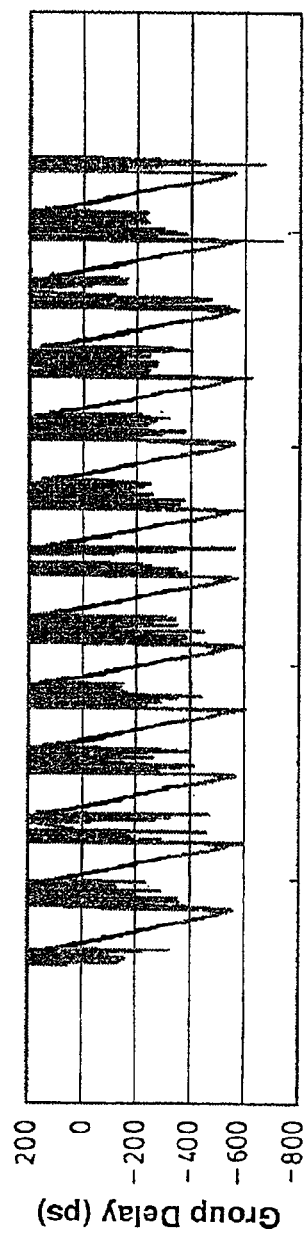
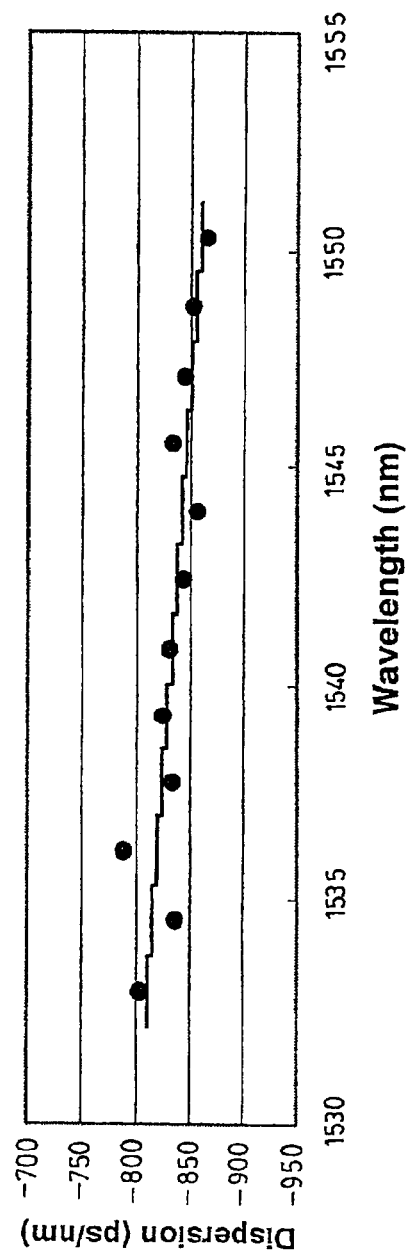
FIG. 9A
FIG. 9B
FIG. 9C

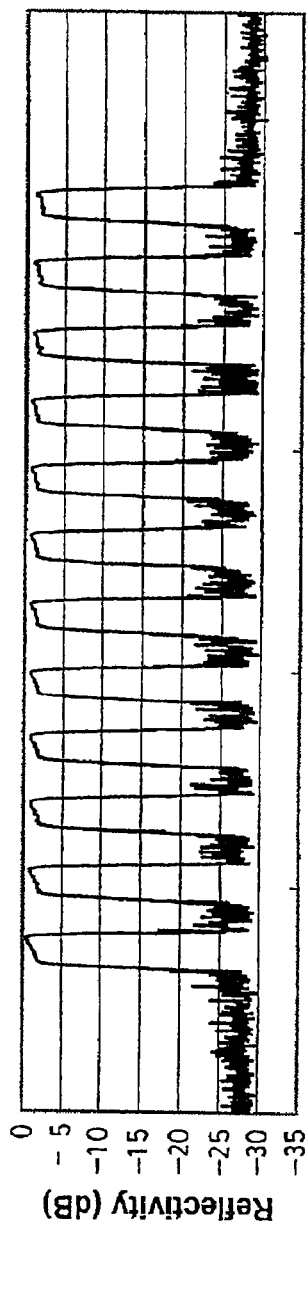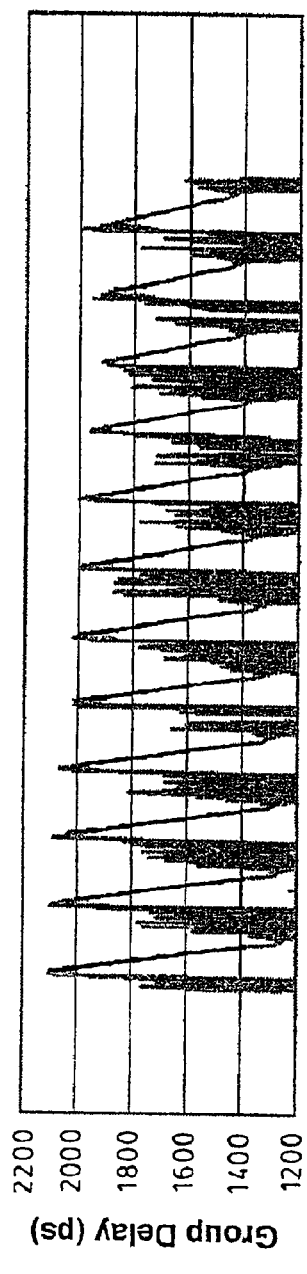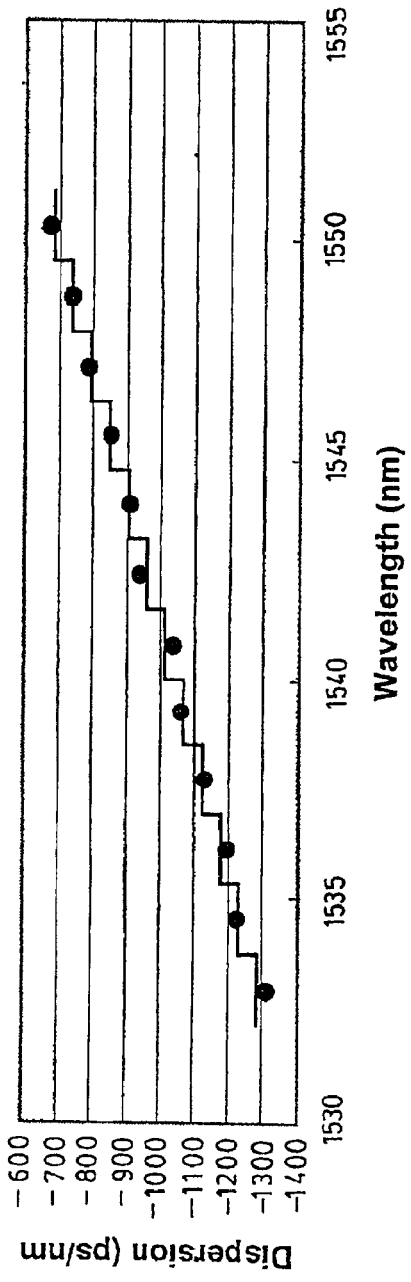
FIG. 10A
FIG. 10B
FIG. 10C

US 6,865,319 B2

OPTICAL STRUCTURE FOR THE COMPENSATION OF CHROMATIC DISPERSION IN A LIGHT SIGNAL

This application claims the priority of U.S. Provisional Application No. 60/307,365, filed on Jul. 25, 2001 which is hereby incorporated hereby by reference in its entirety.

FIELD OF THE INVENTION

The present invention relates to the compensation of chromatic dispersion occurring in waveguides such as optical fibers. More specifically, the invention concerns an optical structure for dispersion compensation based on a Bragg grating, and operating at several wavelengths or Wavelength-Division-Multiplexing (WDM) channels.

BACKGROUND OF THE INVENTION

In optical telecommunication systems, one of the many difficulties encountered is the chromatic dispersion of light signals propagating over long distances in optical fibers. The chromatic dispersion in non-dispersion-shifted optical fiber is nominally 17 ps/nm/km in the 1550 nm telecommunication window, but this value changes as a function of the wavelength: its value changes by about 2 ps/nm/km between 1530 nm and 1565 nm. Several single-channel dispersion compensators based on Fiber Bragg gratings (FBGs) have been proposed, and although this solution was demonstrated to be an appropriate solution for compensating the chromatic dispersion in a single WDM channel, for multi-channel systems, the spectral variation of the chromatic dispersion must be taken into account, especially for data transmission systems operating at high rates such as 10 and 40 Gbit/s. There is therefore a need for a broadband dispersion compensator that compensates for the chromatic dispersion but also for its spectral variation. This feature is often referred to as the slope compensation.

Fiber Bragg gratings are a well established technology for the fabrication of components for optical telecommunications, especially for WDM. Basically, a Bragg grating allows light propagating into an optical fiber to be reflected back when its wavelength corresponds to the grating's Bragg wavelength, related to its period. A chirped Fiber Bragg Grating, in which the grating period varies as a function of the position along the fiber, represents a well known solution for compensating the chromatic dispersion of an optical fiber link (F. Ouellette, "*Dispersion cancellation using linearly chirped Bragg grating filters in optical waveguides*," Opt. Lett., 12, pp.847–849, 1987; R. Kashyap, "*Fiber Bragg gratings*," Academic Press, 458p., 1999). Such a grating compensates for the accumulated dispersion since the group delay varies as a function of the wavelength. An appropriate grating can be fabricated such that the wavelength dependence of its group delay is just the opposite of that of the fiber link. Different solutions based on FBGs have been proposed for broadband dispersion compensation but most of them do not include the slope compensation.

Referring to M Durkin et al. "*1 m long continuously written fibre Bragg grating for combined second- and third-order dispersion compensation*", Electron. Lett. 33, pp 1891–1893 (1997) and J. F. Brennan et al. in BGPP 1999, pp.35–37, ultra-long FBGs, up to 10 m, have been demonstrated for dispersion compensation over a large bandwidth. However, such devices suffer from high group delay ripples. The group delay of a compensator based on ultra-long FBGs is schematically illustrated in FIG. 1 (prior art). The chromatic dispersion the device compensates for is given by the slope of the group delay. The example shown in FIG. 1 has a dispersion of −1250 ps/nm and thus compensates for the chromatic dispersion accumulated over a 73 km long fiber link.

Sampled FBGs and Moiré FBGs have also been proposed in U.S. Pat. No. 5,384,884 (KASHYAP et al.) noteworthy for multi-channel dispersion compensation (see for example A. E. Willner, et al., "*Tunable compensation of channel degrading effects using nonlinearly chirped passive fiber Bragg gratings*," IEEE J. of Selected Topics in Quantum Electron., 5, pp.1298–1311 (1999), U.S. Pat. No. 5,982,963 (FENG et al.); A. V. Buryak et al., "*Novel multi-channel grating designs*", Proceedings of BGPP 2001; and M. Ibsen et al., "*Chirped moiré fiber gratings operating on two-wavelength channels for use as dual-channel dispersion compensators*," IEEE Photon. Technol. Lett., 10, pp.84–86, (1998)) in which the sampling function replicates a given dispersion function (M. Ibsen et al, "*Sinc-sampled fiber Bragg gratings for identical multiple wavelength operation*," IEEE Photon. Technol. Lett., 10, pp.842–844, 1998). As a result, all the channels are identical and the resulting device cannot compensate for the dispersion slope. The group delay of such a compensator based on a sampled FBG is schematically illustrated in FIG. 2 (prior art). An approach for multi-channel slope compensation has been proposed based on interleaved sampled Bragg gratings in W H Loh et al. "*Sampled fiber grating based dispersion slope compensator*", >>Photonics Technol. Lett. 11, no 10, pp 1280–1282 (1999). The theoretical approach is expected to suffer from significant practical difficulties associated with the control of the many micro-grating structures.

Single-channel non-linearly chirped FBGs have been proposed for narrowband dispersion slope compensation (J. A. R. Williams et al., "*Fiber Bragg grating fabrication for dispersion slope compensation*," IEEE Photon. Technol. Lett., 8, pp.1187–1189, 1996). In order to achieve operation over a broader range, multi-channel non-linearly chirped FBGs were proposed (Y. Xie et al., "*Tunable compensation of the dispersion slope mismatch in dispersion-managed systems using a sampled nonlinearly chirped FBG*," IEEE Photon. Technol. Lett., 12, pp.1417–1419, 2000). This last approach allows a tuning of the dispersion but the spectral duty factor is limited to about 25%.

OBJECTS AND SUMMARY OF THE INVENTION

It is an object of the present invention to provide an optical structure allowing the compensation for both the chromatic dispersion of light signals and the dispersion slope.

It is a preferred object of the present invention to provide a multi-channel dispersion compensator based on such an optical structure.

Accordingly, in accordance with a first aspect of the invention, there is provided an optical structure for the compensation of chromatic dispersion in a light signal having a plurality of wavelength channels, each wavelength channel having accumulated a different chromatic dispersion.

The optical structure includes an optical waveguide having a light propagation axis, and a Bragg grating provided in the waveguide across the light propagation axis. The Bragg grating has a plurality of grating components each associated with one or a few of the wavelength channels, and having a spatially variable period chosen to compensate for the chromatic dispersion of this or these wavelength channels.

In accordance with a second aspect of the present invention, there is provided another optical structure for the compensation of chromatic dispersion in a light signal having a plurality of wavelength channels, each wavelength channel having accumulated a different chromatic dispersion.

In accordance with a second aspect of the invention, there is also provided a multi-channel dispersion compensator for the compensation of chromatic dispersion in a light signal having a plurality of wavelength channels, each wavelength channel having accumulated a different chromatic dispersion.

The compensator includes an optical structure having an optical waveguide having a light propagation axis, and a Bragg grating provided in this waveguide across the light propagation axis. The Bragg grating has a plurality of grating components each reflecting one or a few of the wavelength channels and having a spatially variable period chosen to compensate for the dispersion of this or these wavelength channels.

The compensator also includes an optical coupling device coupled to the optical waveguide. The optical coupling device has an input port for receiving the light signal, an input/output port for propagating this light signal in the optical structure and receiving a reflection thereof by the Bragg grating, and an output port for outputting the reflected light signal.

In accordance with a third aspect of the present invention, there is also provided a multi-channel dispersion compensator for the compensation of chromatic dispersion in a light signal having a plurality of wavelength channels, each wavelength channel having accumulated a different chromatic dispersion. The compensator includes an optical waveguide having a light propagation axis. A plurality of optical structures are provided in this waveguide across the light propagation axis, each of these optical structures comprising a Bragg grating having a plurality of grating components. Each grating component reflects one or a few of the wavelength channels, and has a spatially variable period chosen to compensate for the dispersion of this or these channels. The compensator also includes an optical coupling device coupled to the optical waveguide. The optical coupling device has an input port for receiving the light signal, an input/output port for propagating this light signal in the optical waveguide and receiving a reflection thereof by the Bragg gratings of the optical structures, and an output port for outputting the reflected light signal.

Other features and advantages of the present invention will be better understood upon reading of preferred embodiments thereof with reference to the appended drawings.

BRIEF DESCRIPTION OF THE DRAWINGS

FIGS. 9A and 9B respectively show the reflectivity and group delay spectra of a 12-channel third-order dispersion compensation grating; FIG. 9C is a graph where the dots represent the dispersion values obtained from a curve fit of the group delay while the solid line represents the target.

FIGS. 10A and 10B respectively show the reflectivity and group delay spectra of a 12-channel dispersion slope compensation grating; FIG. 10C is a graph where the dots represent the dispersion values obtained from a curve fit of the group delay while the solid line represents the target.

DESCRIPTION OF PREFERRED EMBODIMENTS OF THE INVENTION

Figure 1:
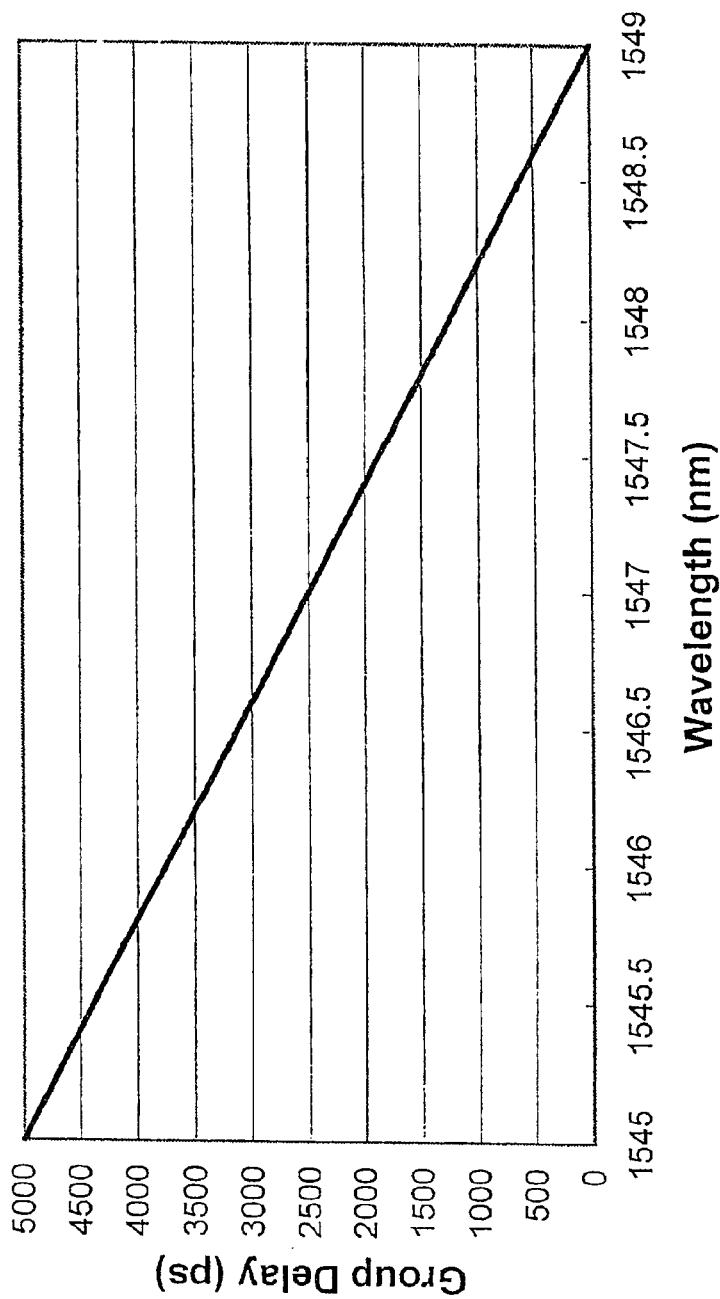
FIG. 1 (PRIOR ART) is a graph of the group delay of a broadband dispersion compensator based on ultralong chirped Fiber Bragg Gratings.
Figure 2:
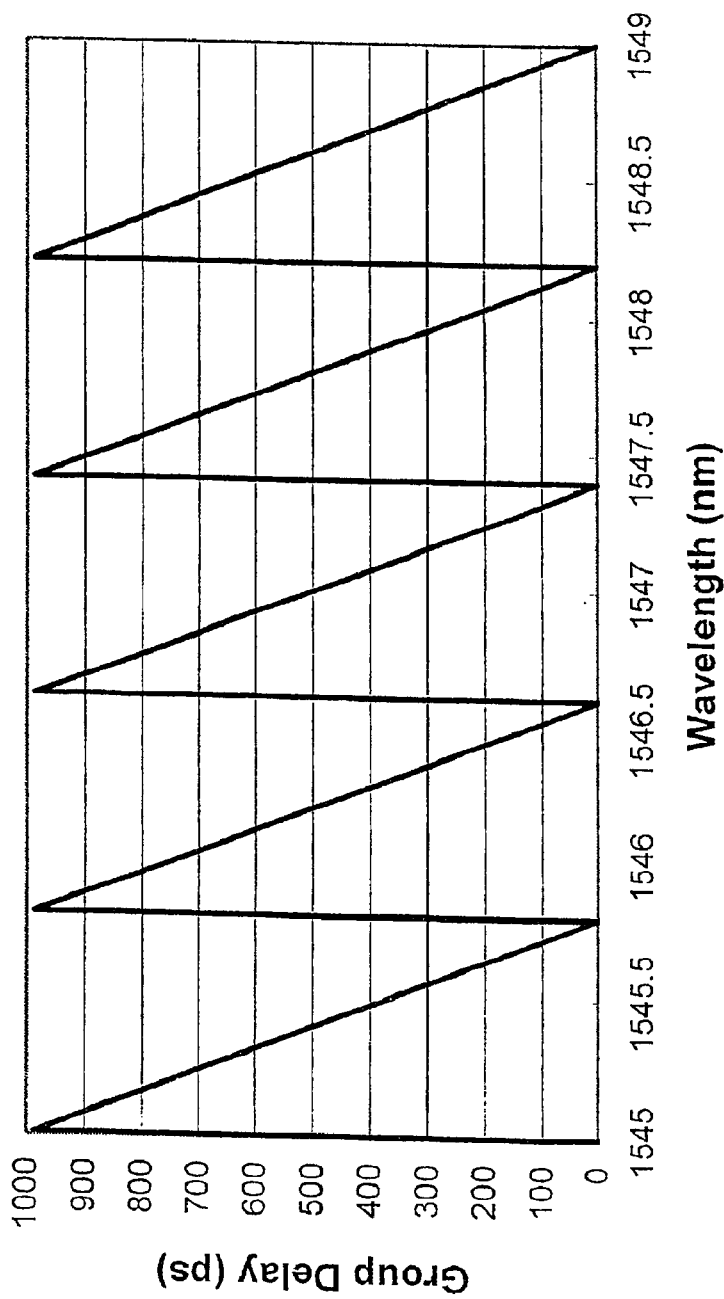
FIG. 2 (PRIOR ART) is a graph of the group delay of a broadband dispersion compensator based on sampled chirped Fiber Bragg Gratings in which all the channels are identical.

The present invention provides an optical structure which can compensate for the chromatic dispersion accumulated by a light signal over a certain propagation distance, but also for the channel-to-channel dispersion variations.

A single-channel Bragg grating is described by its longitudinal index profile which can be written as:

$$n(z) = n_{eff}(z) + \Delta n(z) \sin\left(\int_0^z \frac{2\pi}{p(z')} dz'\right), \quad (1)$$

where z is the position along the axis of the waveguide, $n_{eff}(z)$ is the averaged effective index (considered to vary only slowly along the axis), $\Delta n(z)$ is the amplitude of the index modulation which can vary along the axis in order to include, for example, an apodization profile, and $p(z')$ is the grating period, which can also vary along the axis. For commodity, the z axis is defined such that z=0 corresponds to the center of the grating.

A Bragg grating can compensate for the chromatic dispersion when it is linearly chirped, that is, when its period varies linearly along the z axis according to:

$$p(z) = p_o + \alpha \cdot z \quad (2)$$

The grating reflects light having a wavelength equal (or close) to the Bragg wavelength given by:

$$\lambda_B(z) = 2 n_{eff} p(z) \quad (3)$$

The Bragg wavelength $\lambda_B(z)$ varies along the grating when the period varies monotonously as a function of z. Light having a wavelength $\lambda_B(z)$ is reflected by the grating at location z while light having a wavelength $\lambda_B(z+\Delta z)$ is reflected at location $z+\Delta z$. With respect to the light of wavelength $\lambda_B(z)$, the light of wavelength $\lambda_B(z+\Delta z)$ is delayed in time by a group delay $\Delta t_g$ given by:

$$\Delta t_g = \frac{2\Delta z n_g}{c}, \tag{4}$$

where $n_g$ is the group index of the fiber and c is the light velocity in vacuum. The dispersion D is the wavelength derivative of the group delay. Assuming that $\Delta z$ is small, D is given by:

$$D = \frac{\Delta t_g}{\lambda_B(z+\Delta z) - \lambda_B(z)} = \frac{n_g^2}{cn_{\mathit{eff}}^2 \left(\frac{d}{dz}p(z)\right)}. \tag{5}$$

In the case of p(z) given by Equation (2), the dispersion of the grating can compensate for reduces to:

$$D = \frac{n_g^2}{cn_{\mathit{eff}}^2 \alpha}. \tag{6}$$

Higher order dispersion compensation can also be taken into account by using a non-linearly chirped Bragg grating having a period given by:

$$p(z) = p_o + \alpha \cdot z + \beta \cdot z^2 + \gamma \cdot z^3 + \ldots \tag{7}$$

A multi-channel Bragg grating is basically a combination of several Bragg grating components and reflects light having a wavelength equal (or close) to several Bragg wavelengths. Its longitudinal index profile can be written as:

$$n(z) = n_{\mathit{eff}}(z) + \sum_{i=1}^{m} \Delta n_i(z) \sin\left(\int_0^z \frac{2\pi}{p_i(z')} dz' + \phi_i\right), \tag{8}$$

where m is the number of grating components, $\Delta n_i(z)$ are the spatially-dependent index modulation amplitudes, $\phi_i$ are the phases of each of the components and $p_i(z')$ are the spatially-dependent periods given by:

$$p_i(z) = p_{oi} + \alpha_i \cdot z + \beta_i \cdot z_3 + \tag{9}$$

A multi-channel Bragg grating can be used as a broadband third-order dispersion compensator if the periods $p_i(z)$ are properly chosen. Suppose that m channels centered at wavelengths $\lambda_i$ must be compensated with dispersion values $D_i$ respectively. Assuming that intra-channel compensation is achieved at the second-order only, the periods $p_i(z)$ must be given, for i=1 to m, by:

$$p_i(z) = \frac{\lambda_i}{2n_{\mathit{eff}}} + \frac{n_g^2}{cn_{\mathit{eff}}^2 D_i} \cdot z. \tag{10}$$

It can be noted that the relative component phases $\phi$ may be chosen arbitrarily, even randomly, or selected in order to minimize the maximum index value along the grating.

The present invention therefore provides an optical structure for the compensation of chromatic dispersion in a light signal having a plurality of wavelength channels, based on the principles explained above.

Figure 3:
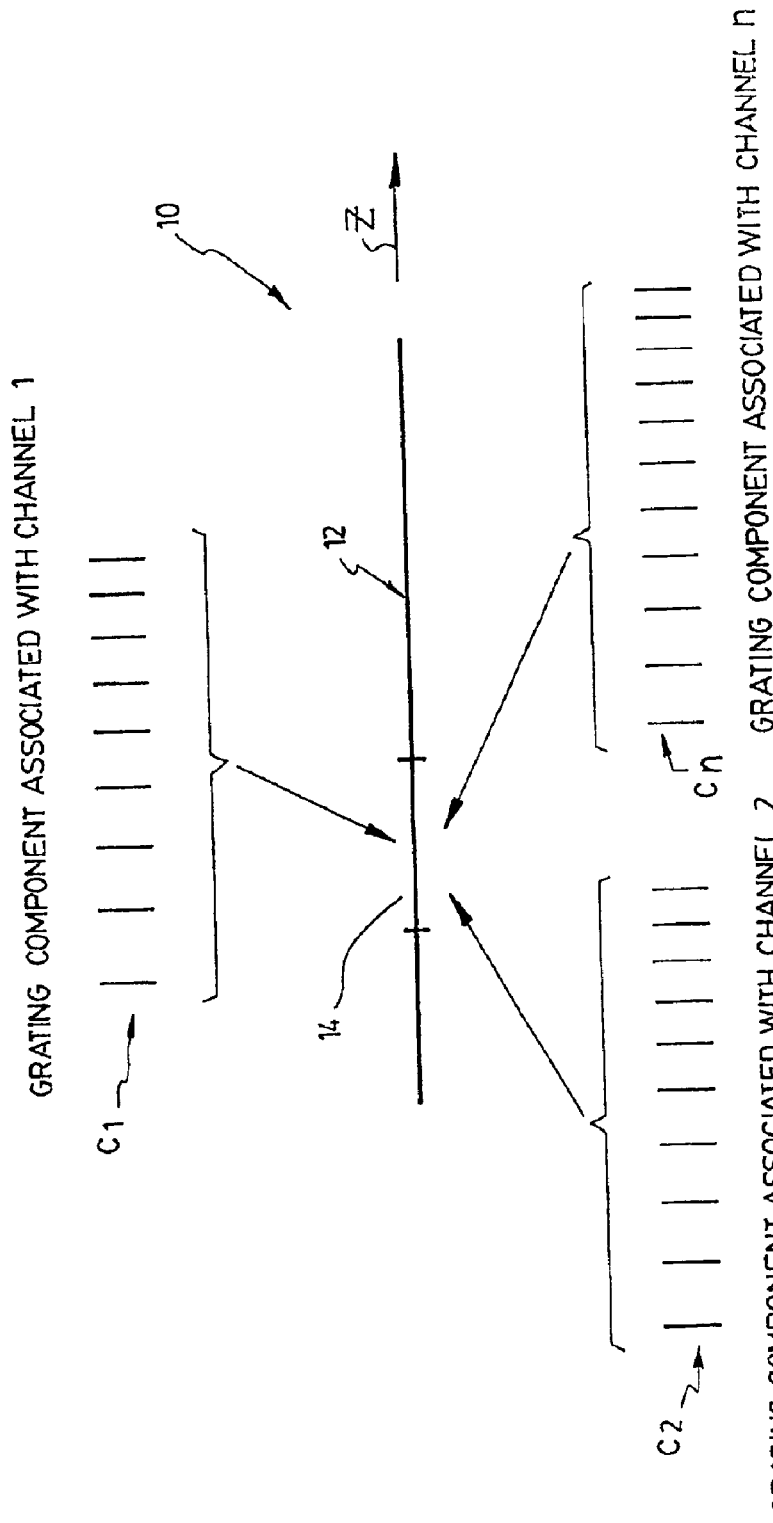
FIG. 3 is a schematized representation of an optical structure according to a first preferred embodiment of the invention.

Referring to FIG. 3, there is schematized an optical structure 10 according to a preferred embodiment of the present invention. It includes an optical waveguide 12, such as a length of optical fiber, having a light propagation axis z. A Bragg grating 14 is provided in the waveguide 12, across the light propagation axis z. The Bragg grating 14 is made of a plurality of grating components ($c_1, c_2, \ldots C_n$). Each component is associated with a limited number of the wavelength channels of the light signal, a single one or a few, and has a spatially variable period chosen to compensate for the chromatic dispersion of this or these particular channels. In this manner, the dispersion compensation provided by the Bragg gratings takes into account the variations in dispersion experienced by each different channel. As one skilled in the art will readily understand, the limited number of channels is selected to include a few neighboring channels having dispersion characteristics close enough to be efficiently compensated by a single grating component. Typically, less than 10 channels would be an appropriate number, although a higher number could be considered if the properties of a given system allowed it. In the embodiments described hereinafter, each grating component will be considered associated with only one wavelength channel, for simplicity, but it is understood that the invention should not be limited to such an embodiment.

Preferably, the Bragg grating 14 defines a longitudinal refractive index profile in the optical waveguide 12 as defined by equation (8). As explained above, the relative phase $\phi_i$ of each grating component can be selected in order to minimize the maximum value of the longitudinal index profile n(z) along the propagation axis, or can be alternatively arbitrarily or randomly selected. Each grating component is preferably linearly chirped, and is preferably chosen according to equation (10). In the alternative, the grating components may be non-linearly chirped.

In the embodiment of FIG. 3, the grating components are superimposed and thereby form a compact structure. This may for example be achieved by using one different phase mask per grating component. As another example, the same Bragg grating may be manufactured by using a single phase mask, changing the Bragg wavelength by stretching the fiber and finely adjusting the chirp of each component using chirp adjustment techniques, such as for example disclosed in Y. Painchaud et al. "*Chirped fibre gratings produced by tilting the fibre*", Electron. Lett, 31, pp 171–172 (1995); M. Cole et al., "*Moving fibre/phase mask scanning beam technique for enhanced flexibility in producing fibre gratings with uniform phase mask*", Electron. Lett. 31, pp 1488–1490 (1995); and U.S. Pat. Nos. 5,903,689 (PAINCHAUD et al.) and U.S. Pat. No. 6,072,926 (COLE et al.). Another alternative would be to use holographic writing techniques which allow flexibility in the grating characteristics. A complex multi-period phase mask may also be used for an easy fabrication of the multi-channel grating. In the alternative the novel technique disclosed in a jointly filed application entitled "METHOD AND APPARATUS FOR RECORDING AN OPTICAL GRATING IN A PHOTOSENSITIVE MEDIUM" to the same assignee, which is incorporated herein by reference, could be used.

Figure 4:
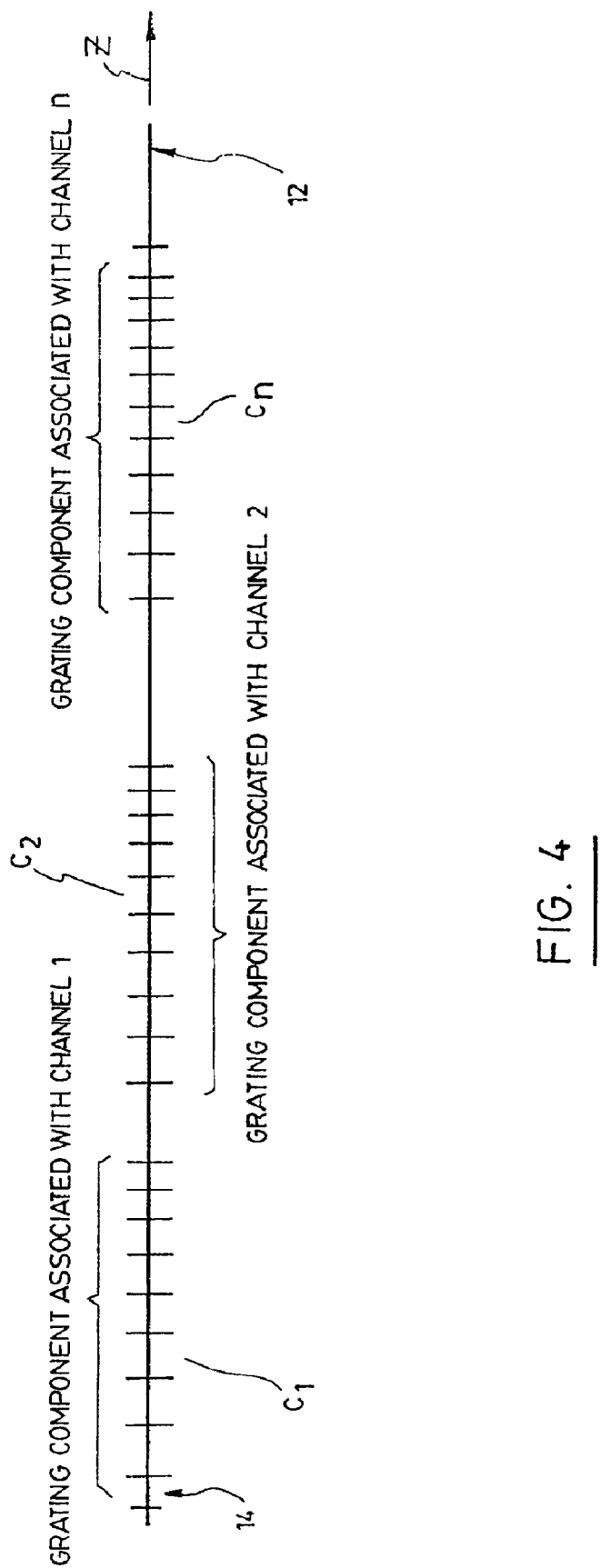
FIG. 4 is a schematized representation of an optical structure according to a second preferred embodiment of the invention.

Referring to FIG. 4, there is illustrated another embodiment of the present invention where the grating components are concatenated, and may for example be manufactured using one of the techniques described above.

Figure 5:
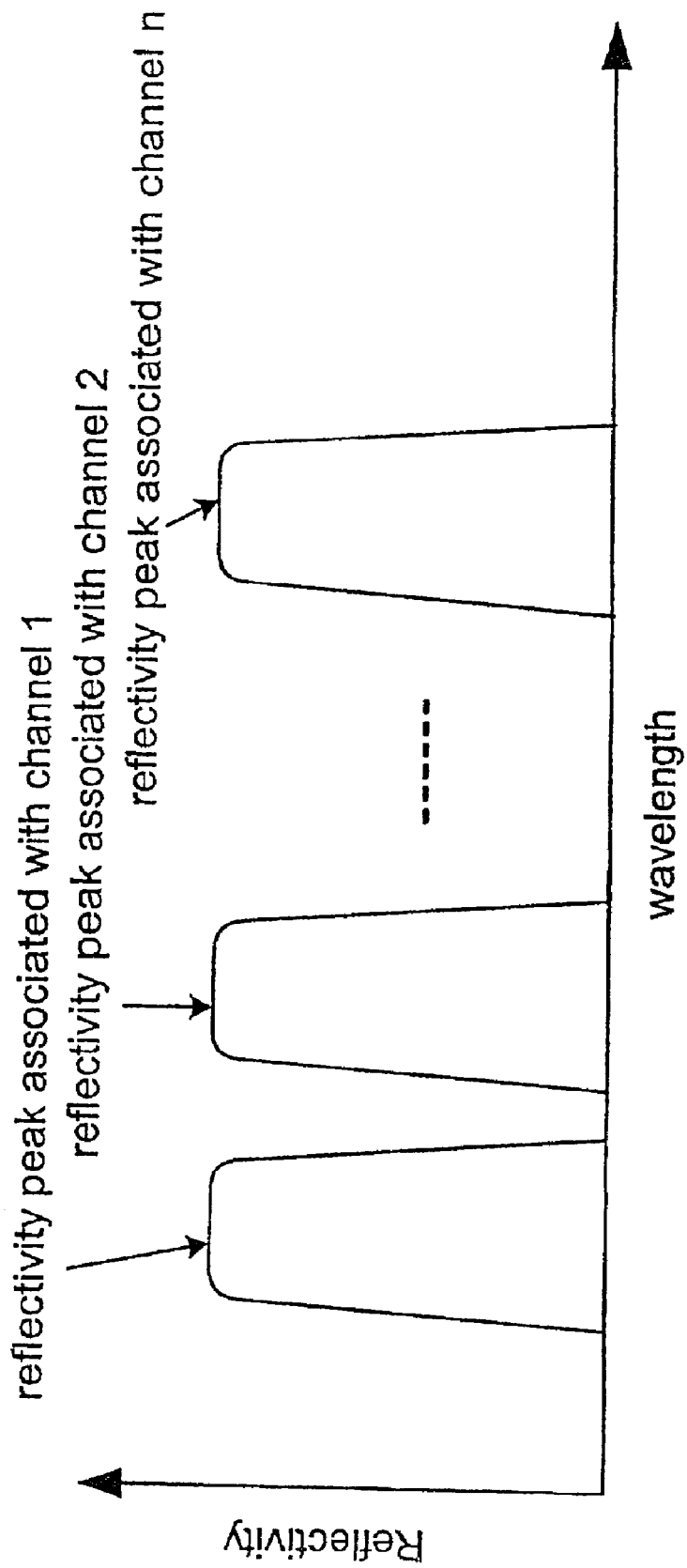
FIG. 5 is a graphical representation of the reflectivity spectrum of light reflected by an optical structure according to the invention.
Figure 6:
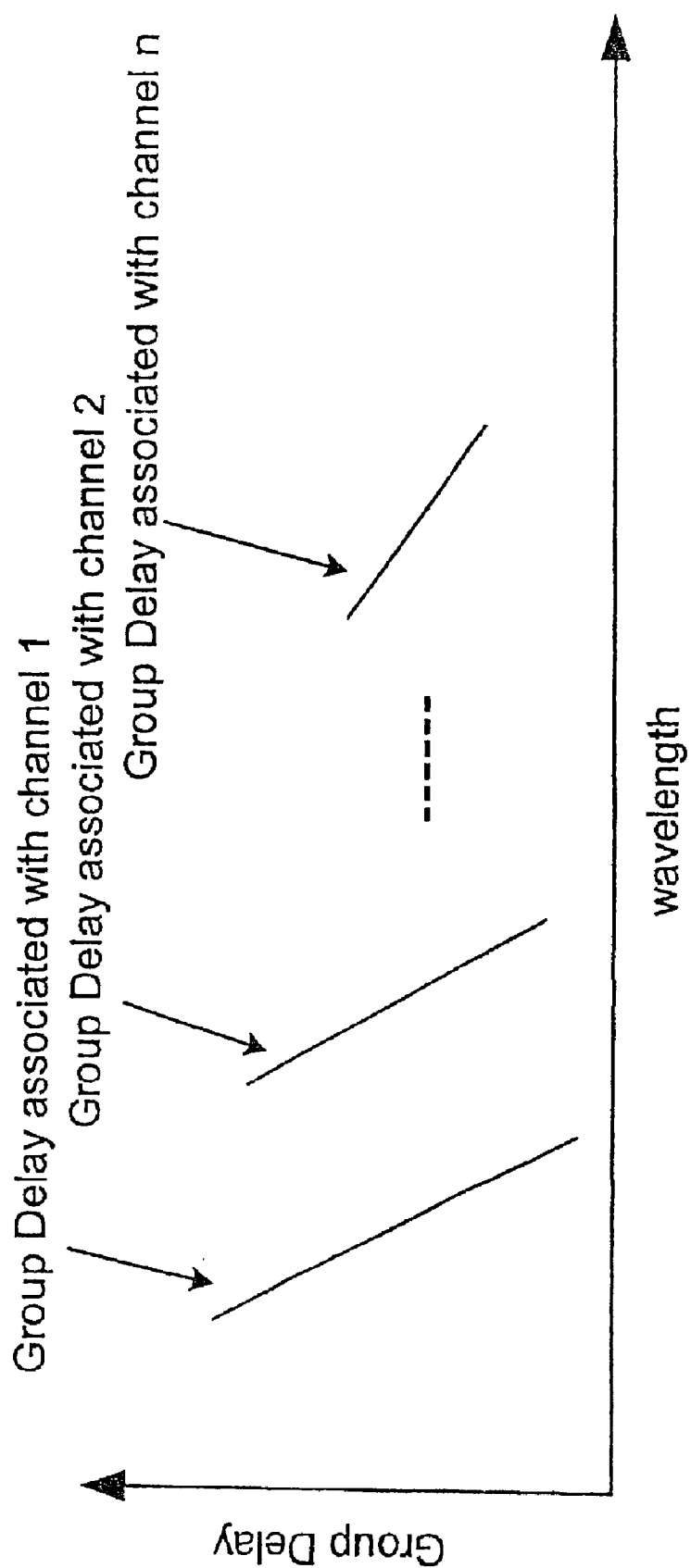
FIG. 6 is a graphical representation of the group delay slope for each channel reflected by an optical structure according to the invention.

FIGS. 5 and 6 respectively show the reflectivity peaks of the resulting structure for each grating component, and their group delays. As may be seen, the group delay slope may be selected to be different for each channel in order to be tailored to the dispersion experienced by each particular channel.

Referring to FIGS. 7A, 7B, 8A and 8B, the present invention also provides a multi-channel dispersion compensator 20.

Figure 7A:
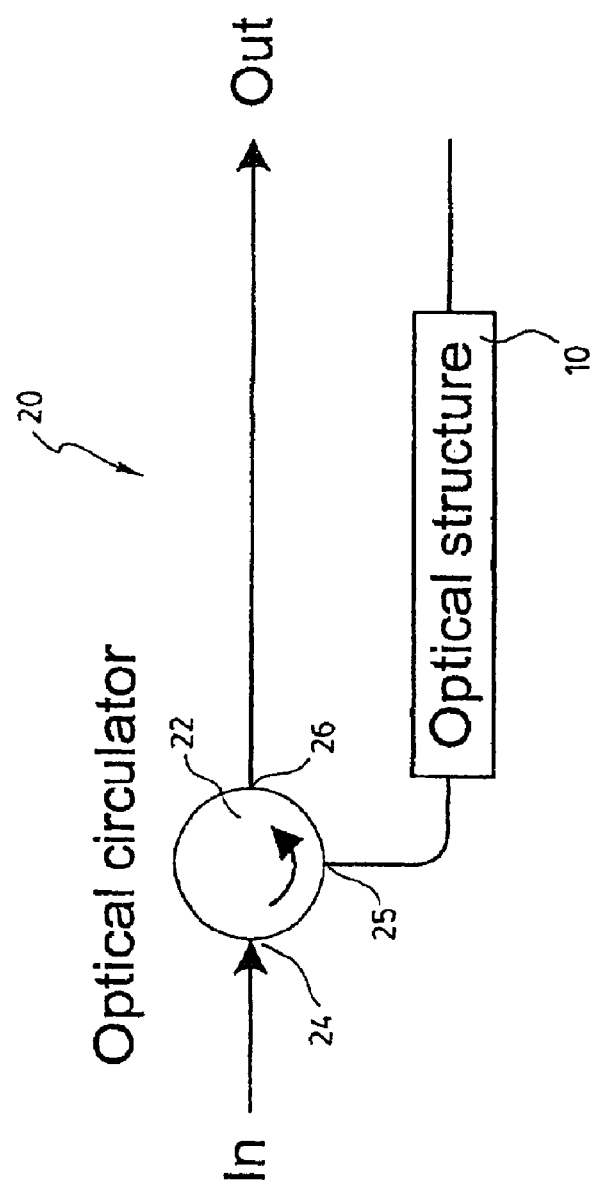
FIG. 7A is a schematized representation of a multi-channel dispersion compensator according to a preferred embodiment of the present invention.
Figure 7B:
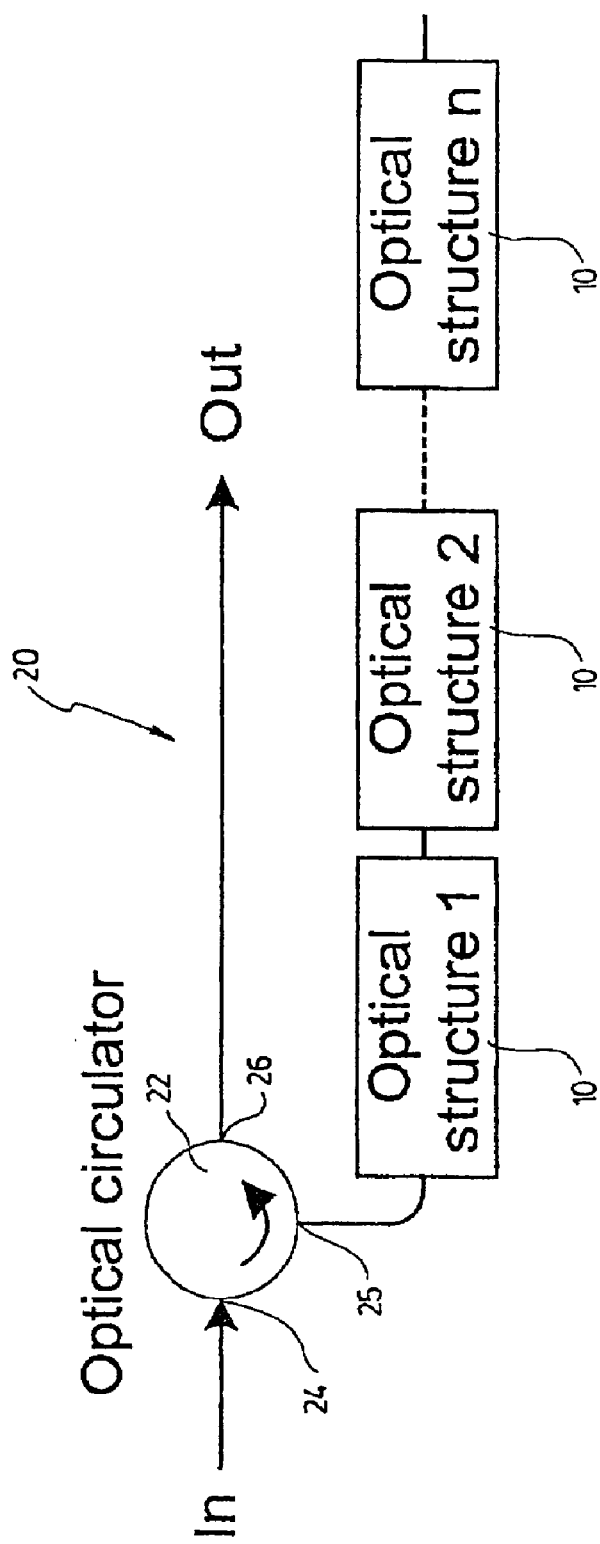
FIG. 7B shows a variant to the embodiment of FIG. 7A.
Figure 8A:
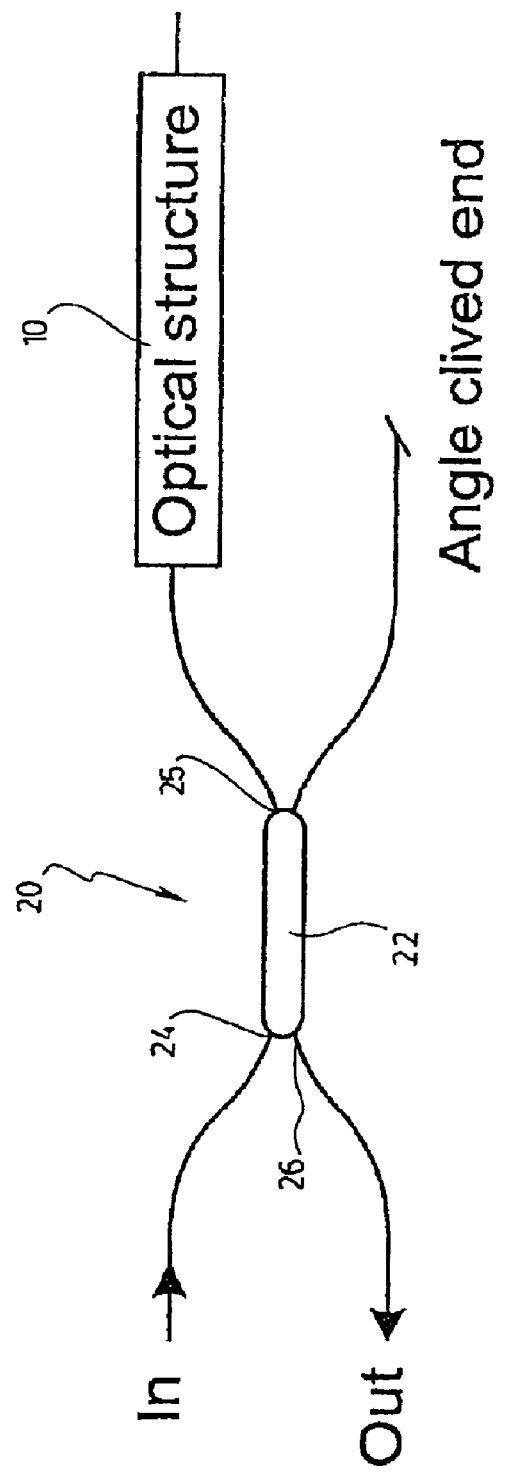
FIG. 8A is a schematized representation of a multi-channel dispersion compensator according to another preferred embodiment of the present invention.
Figure 8B:
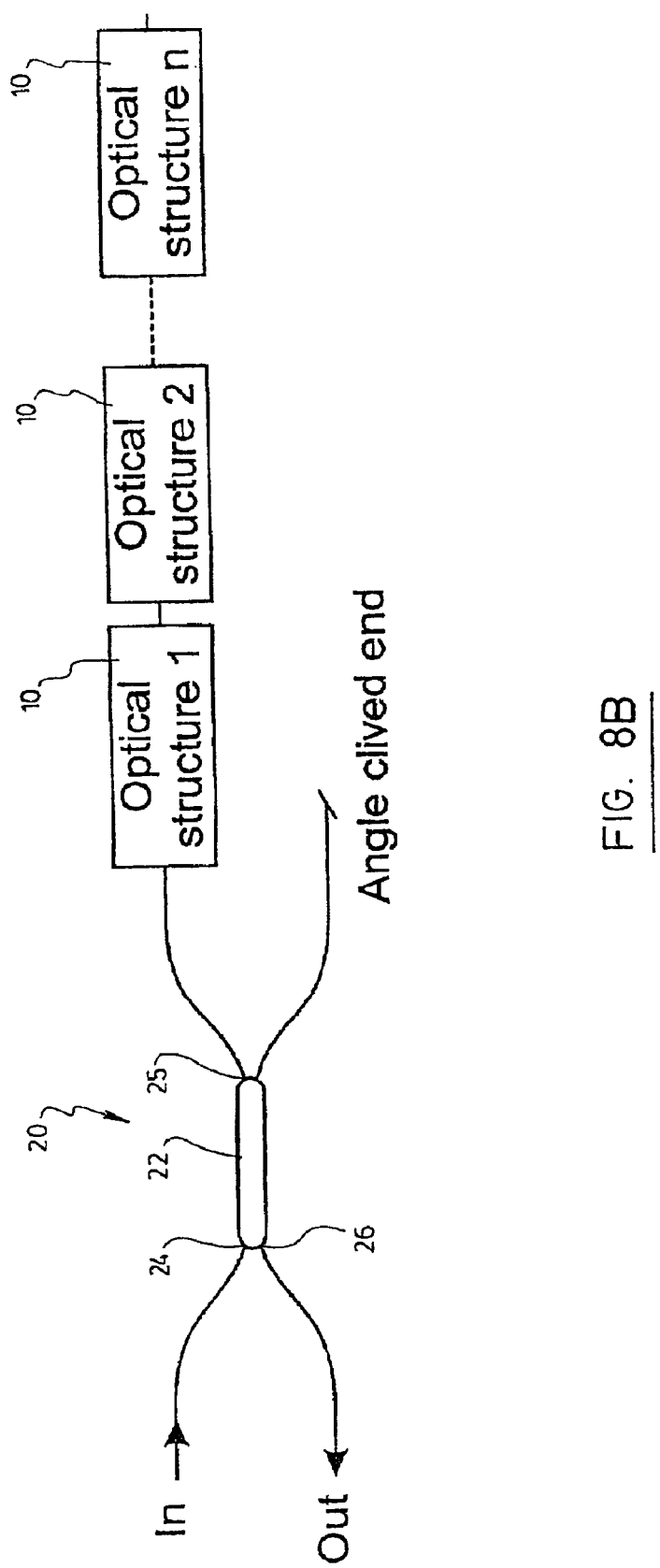
FIG. 8B shows a variant to the embodiment of FIG. 8A.

The compensator 20 includes an optical structure 10 as described above, that is an optical waveguide 12 having a light propagation axis z, and at least one Bragg grating 14 provided in the waveguide 12 across the light propagation axis z. In the embodiments of FIGS. 7A and 8A a single optical structure 10 is provided, whereas a plurality of them are shown in FIGS. 7B and 8B. Each Bragg grating has a plurality of grating components, each associated with one or a few of the wavelength channels and having a spatially variable period chosen to compensate for the dispersion of this channel (or these few channels).

The compensator 20 further includes an optical coupling device 22 coupled to the optical waveguide 12. The optical coupling device 22 has an input port 24 for receiving the light signal, an input/output port 25 for propagating it in the optical waveguide of the optical structure 10, where it is reflected by the Bragg grating, and an output port 26 for outputting the light signal reflected by the Bragg grating (or Bragg gratings).

In FIGS. 7A and 7B, the coupling device 22 is embodied by an optical circulator. In FIGS. 8A and 8B, it is embodied by an optical coupler such as a fused coupler. Any other device appropriate to perform a coupling function is considered to be within the scope of the present invention.

Superimposed grating components in which the chirp of each grating component is slightly different can be used as a third-order dispersion compensator. Referring to FIGS. 9A, 9B and 9C, there is shown an example of a multi-channel dispersion compensation grating that could compensate up to the third-order the dispersion accumulated over 50 km of SMF-28 fiber.

Superimposed grating components in which the chirp of each grating is different, can also be used as a dispersion slope compensator. Such a dispersion slope compensator is of interest in complement to existing broadband dispersion compensation devices such as Dispersion Compensating Fiber (DCF). The DCF compensates properly for one channel, but since its dispersion slope does not match the one of the transport fiber, an incomplete compensation occurs at the other channels. A dispersion slope compensator can then be used to precisely adjust the compensation of all the wavelength channels. For exemple, in 20 consecutive sections of 80 km of SMF-28 fiber each followed by 13.6 km of dispersion compensating fiber (DCF), the spectral variation of the overall dispersion is 36 ps/nm². This variation is due to the fact that the DCF compensates for the dispersion but only for about 60% of the dispersion slope. FIGS. 10A, 10B and 10C show an example of a multi-channel dispersion compensation grating that provides such a dispersion variation.

In addition, to achieve a device in which the dispersion is different channel-per-channel, intra-channel variation of the dispersion can be taken into account. Instead of being linear, non-linear variation of the group delay as a function of the wavelength can be achieved. This can be of interest for intra-band slope compensation (see J. A. R. Williams et al. "Fiber Bragg grating fabrication for dispersion slope compensation", IEEE Photon. Technol. Lett. 8, pp 1187–1189 (1996)). Intra-channel non-linearity may also be desired for tuning applications (see A. E. Willner, et al., "Tunable compensation of channel degrading effects using nonlinearly chirped passive fiber Bragg gratings," IEEE J. of Selected Topics in Quantum Electron., 5, pp.1298–1311 (1999), U.S. Pat. No. 5,989,963 (FENG et al.) and J. A. Fells et al. "Twin fibre grating adjustable dispersion compensator for 40 Gbits/s", Proc. ECOC 2000).

Of course, numerous changes or modifications could be made to the embodiments described above without departing from the scope of the invention as defined in the appended claims.

What is claimed is:

1. An optical structure for the compensation of chromatic dispersion in a light signal having a plurality of wavelength channels, each wavelength channel having accumulated a different chromatic dispersion, said optical structure comprising:

an optical waveguide having a light propagation axis; and
a Bragg grating provided in said waveguide across the light propagation axis, said Bragg grating having a plurality of grating components each of said components being associated with a limited number of said wavelength channels and having a spatially variable period chosen to compensate for the chromatic dispersion of said limited number of wavelength channels, said Bragg grating defining a longitudinal refractive index profile in said waveguide as defined by the equation:

$$n(z) = n_{eff}(z) + \sum_{i=1}^{m} \Delta n_i(z) \sin\left(\int_0^z \frac{2\pi}{p_i(z')} dz' + \phi_i\right)$$

where z is the propagation axis of the waveguide, $n_{eff}(z)$ is the average effective index in the waveguide considered slowly varying along the propagation axis, m is the number of grating components in the Bragg grating, $\Delta n_i(z)$ is the spatially dependent index modulation amplitude of a $i^{th}$ grating component, $p_i(z)$ is the spatially variable period of the $i^{th}$ grating component and $\phi_i$ is a relative phase associated with the $i^{th}$ grating component.

2. The optical structure according to claim 1, wherein said waveguide is an optical fiber.

3. The optical structure according to claim 1, wherein each of said grating component is linearly chirped.

4. The optical structure according to claim 3, wherein the spatially variable period of each $i^{th}$ grating component is given by the equation:

$$p_i(z) = \frac{\lambda_i}{2n_{eff}} + \frac{n_g^2}{cn_{eff}^2 D_i} \cdot z$$

where λ is the Bragg wavelength of the grating component, $n_{eff}$ is the average effective index in the grating component considered constant therealong, $n_g$ is the group refractive index of the waveguide, c is the speed of light in a vacuum, D is the chromatic dispersion in the limited number of channels corresponding to said grating component.

5. The optical structure according to claim 1, wherein each of said grating components is non-linearly chirped.

6. The optical structure according to claim 1, wherein the relative phase $\phi_i$ of each grating component is selected in order to minimize a maximum value of the longitudinal index profile n(z) along the propagation axis.

7. The optical structure according to claim 1, wherein the relative phase $\phi_i$ of each grating component is randomly selected.

8. The optical structure according to claim 1, wherein said grating components are superimposed.

9. The optical structure according to claim 1, wherein said Bragg grating components are concatenated.

10. The optical structure according to claim 1, wherein the limited number of wavelength channels comprises less than 10 channels.

11. The optical structure according to claim 1, wherein the limited number of wavelength channels comprises a single channel.

12. A multi-channel dispersion compensator for the compensation of chromatic dispersion in a light signal having a plurality of wavelength channels, each wavelength channel having accumulated a different chromatic dispersion, said compensator comprising:

an optical structure comprising an optical waveguide having a light propagation axis, and a Bragg grating provided in said waveguide across the light propagation axis, said Bragg grating having a plurality of grating components each reflecting a limited number of said wavelength channels and having a spatially variable period chosen to compensate for the dispersion of said limited number of wavelength channels, said Bragg grating defining a longitudinal refractive index profile in said waveguide as defined by the equation:

$$n(z) = n_{\mathit{eff}}(z) + \sum_{i=1}^{m} \Delta n_i(z)\sin\left(\int_0^z \frac{2\pi}{p_i(z')} dz' + \phi_i\right)$$

where z is the propagation axis of the waveguide, $n_{\mathit{eff}}(z)$ is the average effective index in the waveguide considered slowly varying along the propagation axis, m is the number of grating components in the Bragg grating, $\Delta n_i(z)$ is the spatially dependent index modulation amplitude of a $i^{th}$ grating component, $p_i(z)$ is the spatially variable period of the $i^{th}$ grating component and $\phi_i$ is a relative phase associated with the $i^{th}$ grating component; and an optical coupling device coupled to the optical waveguide, said optical coupling device having an input port for receiving said light signal, an input/output port for propagating said light signal in the optical structure and receiving a reflection thereof by the Bragg grating, and an output port for outputting said reflected light signal.

13. A multi-channel dispersion compensator according to claim 12, where said optical coupling device is an optical circulator.

14. A multi-channel dispersion compensator according to claim 12, where said optical coupling device is an optical coupler.

15. A multi-channel dispersion compensator for the compensation of chromatic dispersion in a light signal having a plurality of wavelength channels, each wavelength channel having accumulated a different chromatic dispersion, said compensator comprising:

an optical waveguide having a light propagation axis;

a plurality of optical structures provided in said waveguide across the light propagation axis, each of said optical structures comprising a Bragg grating having a plurality of grating components each associated with a limited number of said wavelength channels and having a spatially variable period chosen to compensate for the dispersion of said limited number of wavelength channels, the Bragg grating of each optical structure defining a longitudinal refractive index profile in said waveguide as defined by an equation of the form:

$$n(z) = n_{\mathit{eff}}(z) + \sum_{i=1}^{m} \Delta n_i(z)\sin\left(\int_0^z \frac{2\pi}{p_i(z')} dz' + \phi_i\right)$$

where z is the propagation axis of the waveguide, $n_{\mathit{eff}}(z)$ is the average effective index in the waveguide considered slowly varying along the propagation axis, m is the number of grating components in the Bragg grating, $\Delta n_i(z)$ is the spatially dependent index modulation amplitude of a $i^{th}$ grating component, $p_i(z)$ is the spatially variable period of the $i^{th}$ grating component and $\phi_i$ is a relative phase associated with the $i_{th}$ grating component; and an optical coupling device coupled to the optical waveguide, said optical coupling device having an input port for receiving said light signal, an input/output port for propagating said light signal in the optical waveguide and receiving a reflection thereof by the Bragg gratings of the optical structures, and an output port for outputting said reflected light signal.

16. A multi-channel dispersion compensator according to claim 15, where said optical coupling device is an optical circulator.

17. A multi-channel dispersion compensator according to claim 15, where said optical coupling device is an optical coupler.

* * * * *

UNITED STATES PATENT AND TRADEMARK OFFICE
CERTIFICATE OF CORRECTION

PATENT NO. : 6,865,319 B2
DATED : March 8, 2005
INVENTOR(S) : Yves Painchaud

It is certified that error appears in the above-identified patent and that said Letters Patent is hereby corrected as shown below:

<u>Title page,</u>
Item [75], Inventors, please delete "Yves Painchaud, Silley (CA)" and substitute
-- Yves Painchaud, Sillery, (CA) --.

Signed and Sealed this

Thirty-first Day of May, 2005

JON W. DUDAS
*Director of the United States Patent and Trademark Office*